UNITED STATES PATENT OFFICE.

TOZABURO SUZUKI, OF SUNAMURA, TOKYO, JAPAN.

PROCESS OF MAKING A FOOD FOR FISH OR ANIMALS, AND A SEASONING.

1,083,769.        Specification of Letters Patent.      Patented Jan. 6, 1914.

No Drawing.      Application filed June 25, 1912. Serial No. 705,862.

*To all whom it may concern:*

Be it known that I, TOZABURO SUZUKI, subject of the Empire of Japan, residing at No. 401 Jibeishinden, Sunamura, in the county of Minami-Katsushika, Province of Tokyo, and Empire of Japan, have invented certain new and useful Improvements in Processes of Making a Food for Fish or Animals, and a Seasoning, of which the following is a specification.

The present invention consists in the process of producing a food for fish reared in hatcheries and for other animals, out of the water in which fish have been boiled in the kettle, as well as out of the liquid extracted by a press, both of these being obtained at the time of the manufacture of fish manure: the water and liquid thus obtained, and from which fish-oil is first drawn off, is condensed by evaporation and then mixed with, and absorbed by, the refuse of starch making or the chopped up substance of other vegetable fiber, which is made into powder or other suitable body after having been well dried.

This invention, further, consists in the process of producing a seasoning by means of moderately condensing water containing nutriment obtained by boiling fresh fish or shell fish: the liquid thus obtained is mixed with dried and ground fish or other suitable substance, specially prepared, which, after having been dried, is reduced to powder or other suitable solid body.

The object of this invention is to manufacture very economically a nourishing food for artificially hatched fish or other animals and the best fragrant seasoning, respectively, out of the nutriment contained in the water in which fish have been boiled and in extracted liquids which have been thrown away heretofore as almost waste materials, at the time of manufacturing fish manure and out of the delicious nutriment driven off from fresh fish or shell fish. These liquids being absorbed respectively into dried starch refuse and dried ground fish, are characterized by their convenience of transport and preservation, being of small solid body.

The method of carrying the invention into practice is given for example as follows: In the manufacture of herring or other fish manure as now practised, the fish, after boiling in a kettle, is removed and pressed, the water in the kettle is repeatedly used for boiling other lots of fish, and the liquid pressed out of the fish, together with the boiled water, has heretofore been thrown away as waste material after the fish-oil has been removed.

In the process of this invention, the above mentioned water and extracted liquid, being cleared of fish-oil, is saved and transferred to a suitable apparatus and is moderately condensed by evaporation. The refuse of corn-starch, potato-starch or sweet potato-starch, wheat or barley bran and other material of vegetable fiber, especially prepared for the purpose, and carefully dried and ground, or chopped up, are mixed with the aforesaid condensed liquid, thus forming a muddy or pasty substance, which, being dried again, is reduced to powder or other suitable solid body.

As stated above, the present invention consists in utilizing the boiled water and the extracted liquid heretofore thrown away at the time of manufacturing fish manure, by means of absorption in various kinds of starch refuse and other substances. It is therefore quite natural that the product thus obtained is rich in nutriment and is very suitable for a food for artificially hatched fish and other animals.

To manufacture a seasoning under the present invention, fresh fish or shell fish is properly reduced to fragments and is put into a kettle after having been carefully washed and cleaned in clear water, to be then boiled in fresh water. The nutriment contained in the same being drawn off and held in solution in the liquid, the remaining body is taken out of the kettle to be submitted under a suitable press or a centrifugal machine for the purpose of drawing off the juice still contained, the juice thus obtained being mixed with the liquid in the kettle. This being repeated several times, the liquid becomes more and more condensed and is then transferred to another vessel, to eliminate by suitable means all fatty and other dirty material consisting of insoluble, inorganic substances. Being thus clarified enough, the liquid is then submitted to a suitable distilling apparatus to be made suitably condensed, and when so condensed provides a liquor consisting of a clarified exudation of cooked fish adapted for receiving a food base. This being done, the aforesaid condensed liquid or clarified exudation is mixed with dried ground fish or other suitable substance specially prepared, to be made into a muddy or pasty body, which, being again dried, is reduced to powder or other suitable solid body. The above describes the complete process herein invented. Thus, the product obtained by the process of the present invention is pure and fragrant, being rich in nutriment a characteristic quality for a seasoning. The further advantage of this process is that fish or shell fish once boiled, can be dried and utilized as fish manure. In short, as already mentioned above, by this process the nutriment contained in fish or shell fish is driven off and dissolved in boiling water and then absorbed into suitable substance according to the desired use. Therefore its products, a food for animals and a seasoning, are not only nutritious and very convenient for transport and preservation, but also are manufactured very economically.

The term fish is employed in the appended claims in its broadest sense including crustacia.

Having now particularly described and ascertained the nature of my said invention and in what manner the same is to be performed, I declare that what I claim is:

1. The process of making a food product comprising mixing juice extracted from cooked fish with a food base and desiccating the mixture.

2. The process of making a food product comprising clarifying juice extracted from cooked fish and then mixing the juice with a food base.

3. The process of making a food product comprising cooking fish, subsequently expressing the juice therefrom, and mixing the expressed juice with a food base.

4. The process of making a food product comprising boiling fish, subsequently expressing the juice therefrom, and then mixing the expressed juice with a food base.

5. The process of making a food product comprising removing the fish oil from water in which fish has been boiled and from liquid expressed from fish in the preparation of fish fertilizer and then mixing the combined water and liquid with a food base.

6. The process of making a food product comprising removing the fish oil from water in which fish has been boiled, and mixing the water with a food base.

7. The process of making a food product comprising removing the fish oil from water in which fish has been boiled, mixing a food base with said water, drying the mixture, and subsequently comminuting the same.

8. The process of making a food product comprising boiling fish, subsequently expressing juice from the boiled fish, mixing the juice and liquor in which the fish was boiled, removing the fish oil from the mixture, and mixing a food base with said mixture.

9. The process of making a food product comprising boiling fish, subsequently expressing juice from the boiled fish, mixing the juice and liquor in which the fish was boiled, removing the fish oil from the mixture, mixing a food base with said mixture, and finally desiccating the resulting mixture.

10. A food product comprising a dried mixture of a food base and juice extracted from cooked fish.

11. A food product comprising a compound of juice extracted from boiled fish, liquor in which fish was boiled, and a food base.

12. A food product comprising comminuted solids resulting from mixing juice from cooked fish with a food base and desiccating the compound.

In testimony whereof I affix my signature in presence of two witnesses.

TOZABURO SUZUKI.

Witnesses:
S. ITO,
Y. FUKUKITA.